US012271919B2

(12) United States Patent
Gauchat et al.

(10) Patent No.: US 12,271,919 B2
(45) Date of Patent: Apr. 8, 2025

(54) PERFORMANCE AND QUALITY IMPROVEMENTS FOR A MARKET RESEARCH PLATFORM

(71) Applicant: SUZY, INC., New York, NY (US)

(72) Inventors: Nicolas Gauchat, Glen Ridge, NJ (US); Bryan Gregg Silverman, New York, NY (US); William Shawn Mansfield, Wilmington, NC (US); Matthew Britton, Brooklyn, NY (US); Albert Avi Savar, New York, NY (US); Chee Seng Sim, Brooklyn, NY (US); Kirby Beth Horwitz, Brooklyn, NY (US); Brit Carthy Hudgins, Exton, PA (US); Dennis Yip, Brooklyn, NY (US); McKenzie Ann Lawton, Brooklyn, NY (US); Alyssa Bender, Sylvan Springs, AL (US); Erika Tierney Bailey, New York, NY (US)

(73) Assignee: SUZY, INC., New York, NY (US)

( * ) Notice: Subject to any disclaimer, the term of this patent is extended or adjusted under 35 U.S.C. 154(b) by 0 days.

(21) Appl. No.: 17/404,162

(22) Filed: Aug. 17, 2021

(65) Prior Publication Data
US 2022/0277326 A1 Sep. 1, 2022

Related U.S. Application Data

(60) Provisional application No. 63/153,991, filed on Feb. 26, 2021.

(51) Int. Cl.
*G06Q 30/02* (2023.01)
*G06N 20/00* (2019.01)
*G06Q 30/0203* (2023.01)

(52) U.S. Cl.
CPC ......... *G06Q 30/0203* (2013.01); *G06N 20/00* (2019.01)

(58) Field of Classification Search
CPC ........................... G06Q 30/0203; G06N 20/00
See application file for complete search history.

(56) References Cited

U.S. PATENT DOCUMENTS 11,082,487 B1 * 8/2021 Jain .......................... H04L 63/20
2013/0204665 A1 * 8/2013 Carsanaro .......... G06Q 30/0203
705/7.32

(Continued)

FOREIGN PATENT DOCUMENTS

CA 3044162 A1 * 11/2019 ............. G06F 16/22
WO WO-2017031290 A1 * 2/2017 ......... G06Q 30/0203

OTHER PUBLICATIONS

Jedinger A, Watteler O, Förster A. Improving the quality of survey data documentation: A total survey error perspective. Data. Oct. 29, 2018;3(4):45. (Year: 2018).*

(Continued)

*Primary Examiner* — Hamzeh Obaid
(74) *Attorney, Agent, or Firm* — Lando & Anastasi, LLP

(57) ABSTRACT

Techniques for improving performance and quality in a market research platform include: obtaining first usage data of a first set of survey respondents to a first market research survey, the first market research survey being associated with a first tenant of a multi-tenant market research survey platform and conforming to a market research survey template provided by the platform; obtaining second usage data of a second set of survey respondents to a second market research survey, the second market research survey being associated with a second tenant of the platform and conforming to the market research survey template; generating a template-specific quality filter associated with the market research survey template, based at least on the first usage (Continued)

data and the second usage data; and based at least on the template-specific quality filter and third usage data of a particular survey respondent, identifying the particular survey respondent as a low-quality respondent.

15 Claims, 16 Drawing Sheets

(56) References Cited

U.S. PATENT DOCUMENTS

| | | | | |
|---|---|---|---|---|
| 2018/0122256 | A1* | 5/2018 | Smith | G09B 7/00 |
| 2019/0188741 | A1* | 6/2019 | Wood | G06F 17/18 |
| 2020/0034685 | A1* | 1/2020 | Kempf | G06N 3/084 |
| 2020/0327506 | A1* | 10/2020 | Litman | G06Q 10/1053 |
| 2020/0342471 | A1* | 10/2020 | Ni | G06Q 30/0203 |
| 2021/0035132 | A1* | 2/2021 | Kopikare | G06Q 30/0203 |
| 2021/0090721 | A1* | 3/2021 | Funk | G06Q 30/08 |
| 2022/0044266 | A1* | 2/2022 | Latka | G06F 16/9535 |
| 2022/0223286 | A1* | 7/2022 | Lach | A61B 5/4824 |

OTHER PUBLICATIONS

International Search Report and Written Opinion from corresponding International Application No. PCT/US2022/070852 dated May 25, 2022.

Mastrotto, et al., "User Activity Anomaly Detection by Mouse Movements in Web Surveys", Supplementary Proceedings of the 22nd International Conference on Data Analytics and Management in Data Intensive Domains, DAMDID/RCDL 202, Oct. 1, 2020, pp. 63-78, XP055921205, Retrieved from the Internet: <http://ceur-ws.org/Vol-2790/paper07.pdf> [retrieved on May 13, 2022]. See especially pp. 63 and 65-75.

* cited by examiner

| Event Name | Event Definition | Property Name | Property Definition | Data Type |
|---|---|---|---|---|
| page_view | The user views a page within the platform product | current_page | The page the user is currently viewing | String |
| | | previous_page | The page the user had been previously viewing | String |
| | | page_load_time | The time it took the page to load | Numeric |
| | | $duration | The amount of time the user spent on the previous page (in seconds) | Numeric |
| sign_up_modal_displayed | The sign up modal is displayed to the user after clicking on a sign up CTA | cta_clicked_text | The text of the CTA that the user clicked to show the sign up modal | String |
| sign_up_modal_response | The user selects a sign up method from the modal | sign_up_method | The method the user is using to sign up | String |
| sign_up_credentials_created | The user either enters an email and password or signs up via Facebook and a positive response is received | sign_up_method | The method the user used to sign up | String |
| sign_up_name_email | The user completes the sign up page requesting their name and email on mobile | | | |
| sign_up_age_gender | The user completes the sign up page requesting their age and gender on mobile | gender | The user's gender as entered by the user | String |
| | | age | The user's age as entered by the user | String |
| sign_up_location | The user completes the sign up page requesting their sign up location on mobile | entered_city | The user's city as entered by the user | String |
| | | entered_state | The user's state as entered by the user | String |
| | | entered_zip | The user's zip code as entered by the user | String |
| sign_up_complete | The user completes the sign up flow and is assigned a user ID | user_id | The user's internal platform ID | String |
| | | entered_city | The user's city as entered by the user | String |

FIG. 2A

| | | |
|---|---|---|
| entered_state | The user's state as entered by the user | String |
| entered_zip | The user's zip code as entered by the user | String |
| gender | The user's gender as entered by the user | String |
| age | The user's age as entered by the user | Numeric |
| is_verified | Whether or not the user is verified | Boolean |
| current_number_of_points | The current number of points for the user | Numeric |
| script_status | The user's current progress through the onboarding script | String |
| script_id | The onboarding script the user was exposed to | String |
| user_id | The user's internal platform ID | String |
| entered_city | The user's city as entered by the user | String |
| entered_state | The user's state as entered by the user | String |
| entered_zip | The user's zip code as entered by the user | String |
| ip_address | The user's IP address | String |
| gender | The user's gender as entered by the user | String |
| age | The user's age as entered by the user | Numeric |
| is_verified | Whether or not the user is verified | Boolean |
| current_number_of_points | The current number of points for the user | Numeric |
| script_status | The user's current progress through the onboarding script | String |
| script_id | The onboarding script the user was exposed to | String |
| $email | The user's email address | String |
| sign_up_date | The date that the user signed up | Date |

FIG. 2B

| Event | Description | Field | Description | Type |
|---|---|---|---|---|
| phone_verification_prompted | The user is prompted to enter their phone number | sign_up_method | The method the user used to sign up | String |
| | | has_profile_photo | Whether or not the user has a profile photo | Boolean |
| phone_verification_started | The user enters their phone number, clicks to continue, and is sent a text. | sign_up_method | The method the user used to sign up | String |
| phone_verification_completed | The user successfully enters the verification code | $phone | The user's verified phone number | String |
| log_in | The user logs into the platform | user_id | The user's internal platform ID | String |
| | | entered_city | The user's city as entered by the user | String |
| | | entered_state | The user's state as entered by the user | String |
| | | entered_zip | The user's zip code as entered by the user | String |
| | | gender | The user's gender as entered by the user | String |
| | | age | The user's age as entered by the user | Numeric |
| | | is_verified | Whether or not the user is verified | Boolean |
| | | current_number_of_points | The current number of points for the user | Numeric |
| | | onboarding_status | The user's current progress in onboarding | String |
| | | education_level | The user's education level as entered by the user | String |
| | | employment_industry | The user's employment industry as entered by the user | String |
| | | occupation | The user's occupation as entered by the user | String |
| | | employment_status | The user's employment status as entered by the user | String |
| | | household_income | The user's household income as entered by the user | String |

FIG. 2C

| Field | Description | Type |
|---|---|---|
| relationship_status | The user's relationship status as entered by the user | String |
| size_of_household | The user's household size as entered by the user | Numeric |
| parenting_status | The user's parenting status as entered by the user | String |
| user_id | The user's internal platform ID | String |
| entered_city | The user's city as entered by the user | String |
| entered_state | The user's state as entered by the user | String |
| entered_zip | The user's zip code as entered by the user | String |
| ip_address | The user's IP address | String |
| gender | The user's gender as entered by the user | String |
| age | The user's age as entered by the user | Numeric |
| is_verified | Whether or not the user is verified | Boolean |
| current_number_of_points | The current number of points for the user | Numeric |
| onboarding_status | The user's current progress in onboarding | String |
| education_level | The user's education level as entered by the user | String |
| employment_industry | The user's employment industry as entered by the user | String |
| occupation | The user's occupation as entered by the user | String |
| employment_status | The user's employment status as entered by the user | String |
| household_income | The user's household income as entered by the user | String |
| relationship_status | The user's relationship status as entered by the user | String |
| size_of_household | The user's household size as entered by the user | Numeric |
| parenting_status | The user's parenting status as entered by the user | String |

FIG. 2D

| | | | |
|---|---|---|---|
| log_out | The user logs out of their account on the platform | $email | The user's email address | String |
| | | login_method | The method the user used to login | String |
| | | log_out | The date/time the user logged out | Date |
| dashboard_object_tile_displayed | The user is displayed a dynamically generated tile to the user dashboard | tile_name | The name of the dynamic tile displayed to the user | String |
| dashboard_filter | The user filters the dashboard tiles | filter_used | | |
| tile_clicked | The user selects and opens a tile | tile_type | The type of tile that was selected by the user | String |
| | | media_type | What type of media is associated with the tile if the tile has media | String |
| | | mission_id | The mission ID associated with the tile if the tile has a mission | String |
| | | action_id | The action ID associated with the tile | String |
| | | brand_id | The brand ID associated with the tile | String |
| | | is_dynamic_tile | Whether the tile the user clicked on has been dynamically generated for them based on backend logic | Boolean |
| | | tile_name | The name of the tile that the user clicked on | String |
| | | tile_index | The tile's position in the grid of tiles | Numeric |
| | | tile_live_duration | How long the tile was live for before it was clicked (in seconds) | Numeric |
| | | point_value | The number of points earned for the selected tile | Numeric |
| mission_start | The user starts a mission | mission_id | The mission ID that was started | String |
| | | brand_id | The brand ID associated with the mission | String |
| | | has_split_testing | Whether or not the action has split testing enabled | Boolean |

FIG. 2E

| | | | |
|---|---|---|---|
| | | split_test_id | The ID of the split test the user received | String |
| | | split_test_variant_id | The ID of the variant the user received in the split test | String |
| | | mission_length | The number of actions the user will be asked to complete | Numeric |
| mission_end | The user ends a mission | mission_id | The mission ID associated with the current action | String |
| | | brand_id | The brand ID associated with the current action | String |
| | | points_earned | The number of points earned for completing the mission | Numeric |
| | | number_of_questions | How many questions were included in the mission | Numeric |
| | | has_split_testing | Whether or not the action has split testing enabled | Boolean |
| | | split_test_id | The ID of the split test the user received | String |
| | | split_test_variant_id | The ID of the variant the user received in the split test | String |
| | | mission_length | The number of actions the user will be asked to complete | Numeric |
| | | $duration | The amount of time that the user took to complete the mission (in seconds) | Numeric |
| media_open | The user clicks on a link to open media as part of an action | mission_id | The mission ID associated with the current action | String |
| | | brand_id | The brand ID associated with the current action | String |
| | | media_type | The media type that's being viewed | String |
| | | destination | Where the user is viewing the media | String |
| | | is_on_question | Whether the media was opened while viewing the screen with the survey question | Boolean |
| | | action_id | The action ID associated with the current action | String |

FIG. 2F

| | | | |
|---|---|---|---|
| media_close | The user closes the media they were viewing. This event is only fired for media hosted by the platform | mission_id | The mission ID associated with the current action | String |
| | | brand_id | The brand ID associated with the current action | String |
| | | media_type | The media type that's being viewed | String |
| | | is_on_question | Whether the media was opened while viewing the screen with the survey question | Boolean |
| | | action_id | The action ID associated with the current action | String |
| | | $duration | The amount of time the user viewed the image (in seconds) | Numeric |
| action_start | The user starts an action | mission_id | The mission ID associated with the current action | String |
| | | brand_id | The brand ID associated with the current action | String |
| | | media_type | The media type that's being viewed | String |
| | | action_id | The action ID associated with the current action | String |
| | | action_type | The type of action that the user has started | String |
| | | has_split_testing | Whether or not the action has split testing enabled | Boolean |
| | | split_test_id | The ID of the split test the user received | String |
| | | split_test_variant_id | The ID of the variant the user received in the split test | String |
| | | is_in_mission | Whether the action is a part of a mission or not | Boolean |
| | | is_photo_upload | Whether or not the user is answering a question that requires a photo to be uploaded | Boolean |
| action_end | The user ends an action | mission_id | The mission ID associated with the current action | String |
| | | brand_id | The brand ID associated with the current action | String |

FIG. 2G

| | | | |
|---|---|---|---|
| | media_type | The media type that's being viewed | String |
| | action_id | The action ID associated with the tile | String |
| | action_type | The type of action that the user has started | String |
| | has_split_testing | Whether or not the action has split testing enabled | Boolean |
| | split_test_id | The ID of the split test the user received | String |
| | split_test_variant_id | The ID of the variant the user received in the split test | String |
| | is_in_mission | Whether the action is a part of a mission or not | Boolean |
| | answer_index | The position(s) of the answer(s) selected by the user | List |
| | characters_per_minute | For open-ended questions, the speed (characters per minute) which the user typed characters into the textbox | Numeric |
| | $duration | The amount of time it took the user to complete the action (in seconds) | Numeric |
| | points_earned | The number of points earned for completing the action | Numeric |
| | is_photo_upload | Whether or not the user is answering a question that requires a photo to be uploaded | Boolean |
| | is_skipped | Whether or not the user skipped the question | Boolean |
| | onboarding_status | The user's current progress in onboarding | String |
| trap_question_failed | action_id | The action ID associated with the question | String |
| The user fails a trap question and the caution modal is displayed | response_given | The answer given to the trap question | String |
| | onboarding_status | The user's current progress in onboarding | String |

FIG. 2H

| Event | Description | Field | Field Description | Type |
|---|---|---|---|---|
| points_earned | The user earns points | points_earned | The number of points earned by the user | Numeric |
| | | earn_method | How the user earned points | String |
| | | current_number_of_points | The current number of points for the user | Numeric |
| profile_update_started | The user clicks to update their profile | | | |
| profile_update_personal_info_completed | The user completes and confirms updates to the personal information section | fields_edited | Which fields were edited in the section | List |
| profile_update_location_completed | The user completes and confirms updates to the location section | fields_edited | Which fields were edited in the section | List |
| | | entered_city | The user's city as entered by the user | String |
| | | entered_state | The user's state as entered by the user | String |
| | | entered_zip | The user's zip code as entered by the user | String |
| | | entered_city | The user's city as entered by the user | String |
| | | entered_state | The user's state as entered by the user | String |
| | | entered_zip | The user's zip code as entered by the user | String |
| profile_update_education_completed | The user completes and confirms updates to the education section | fields_edited | Which fields were edited in the section | List |
| | | education_level | The user's education level as entered by the user | String |
| | | education_level | The user's education level as entered by the user | String |
| profile_update_employment_completed | The user completes and confirms updates to the employment section | fields_edited | Which fields were edited in the section | List |
| | | employment_industry | The user's employment industry as entered by the user | String |
| | | occupation | The user's occupation as entered by the user | String |
| | | employment_status | The user's employment status as entered by the user | String |
| profile_update_income_completed | The user completes and confirms updates to the income section | fields_edited | Which fields were edited in the section | List |

FIG. 21

| | | household_income | The user's household income as entered by the user | String |
|---|---|---|---|---|
| profile_update_parenting_completed | The user completes and confirms updates to the parenting section | household_income | The user's household income as entered by the user | String |
| | | relationship_status | The user's relationship status as entered by the user | String |
| | | size_of_household | The user's household size as entered by the user | Numeric |
| | | fields_edited | Which fields were edited in the section | List |
| | | parenting_status | The user's parenting status as entered by the user | String |
| profile_update_all_completed | The user confirms their profile updates and their profile is locked | | | |
| basic_account_information_updated | The user updates their basic information on the account page | fields_edited | Which fields were edited in the section | List |
| | | $first_name | The user's first name as entered by the user | String |
| | | $last_name | The user's last name as entered by the user | String |
| | | has_profile_photo | Whether or not the user has a profile photo | Boolean |
| pause_account_intent | The user clicks to pause their account | | | |
| delete_account_intent | The user clicks to delete their account | | | |
| support_clicked | The user clicks the support button | current_page | Which page the user was on when they clicked the support tab | String |
| support_ticket_filed | The user completes the support form and sends it via the app | category | The category the user selected when they filed the ticket | String |
| account_blocked | The user's account is blocked | block_reason | The reason the user's account was blocked | String |
| account_block_error_viewed | The user views the error message that their account has been blocked | | | |
| account_unblocked | The user's account is unblocked | | | |

FIG. 2J

| | | | |
|---|---|---|---|
| verification_eligible | The user is eligible for verification | | |
| verification_started | The user starts the verification process | start_location | Where the user starts the verification flow from | String |
| verification_info_completed | The user completes the verification information | | |
| verification_info_confirmed | The user confirms the information they entered | entered_city | The user's city as entered by the user | String |
| | | entered_state | The user's state as entered by the user | String |
| | | entered_zip | The user's zip code as entered by the user | String |
| | | entered_city | The user's city as entered by the user | String |
| | | entered_state | The user's state as entered by the user | String |
| | | entered_zip | The user's zip code as entered by the user | String |
| | | $email | The user's email | String |
| | | $phone | The user's phone number | String |
| | | $first_name | The user's first name as entered by the user | String |
| | | $last_name | The user's last name as entered by the user | String |
| verification_approved | The user's verification is approved | is_verified | Whether or not the user is verified | Boolean |
| verification_rejected | The user's verification is rejected | | |

FIG. 2K

| Event Name | Attribute Definition | Sample Data |
|---|---|---|
| action_start | The time at which a user clicked on a question to start it. | |
| action_end | The time at which a user has completed a question. | |
| OE | Open ended question which requires a user to type text into the answer box. | Q- "What is your favorite color" A- "Blue" |
| answer_type | Answer type describes how the question is asked/laid out and how the user must answer it. | open ended, multiple choice, etc. |
| mission | A mission is a survey, which can be composed of open ended questions, grids, or multiple choice questions. | "Survey About Coffee!" |
| mission_start | The time at which a user clicked on a survey to start it. | |
| mission_end | The time at which a user completed the survey. | |
| brand_id | The client brand that the question is launched under. | |
| onboarding | A series of questions used in order to confirm that respondents are paying attention and providing quality answers. | |
| answer_index=1 | The position of the answer, in this case it would be the first answer choice. | A. Dog B. Cat C. Mouse (A. Dog would be index 1) |
| login_in | How many times a user logs in to the platform. | |
| session_start | The time at which a user logs in to the platform starting their session. | |
| session_end | The time at which a user ends their session. | |

FIG. 3

| Equation | Action | Equation Definition |
|---|---|---|
| action_start + action_end + answer_type OE < 5 seconds | Alert internal Staff | If a user starts and ends an open ended question in under 5 seconds, send an alert. |
| mission_start + mission_end < 10 seconds | Alert internal Staff | If a user starts a survey and completes it in less then 10 seconds, send an alert. |
| mission_start + mission_end conversion + brand_id onboarding < 1 minute | Alert internal Staff | If a user starts a survey in the onboarding brand and completes it in lesss then a minute, send an alert. |
| action_start > 100 times per day | Alert internal Staff | If a user starts more than 100 questions in a day, send an alert. |
| action_start + action_end + answer_index=1 > 6 in a row | Alert internal Staff | If a user answers a question with the first answer choice more then 6 times in a row, send an alert. |
| log_in > 20 times per day | Ban | If a user logs in more then 20 times in one day, ban them. |
| session_start + session_end conversion > 1 hour | Alert internal Staff | If the length of the session of a user is more then 1 hour, send an alert. |

FIG. 4

PERFORMANCE AND QUALITY IMPROVEMENTS FOR A MARKET RESEARCH PLATFORM

RELATED APPLICATIONS

This application claims the benefit of U.S. Provisional Patent Application Ser. No. 63/153,991, titled "PERFORMANCE AND QUALITY IMPROVEMENTS FOR A MARKET RESEARCH PLATFORM" and filed Feb. 26, 2021, which is hereby incorporated by reference in its entirety.

BACKGROUND

In market research, "low-quality" responses are responses that have little or no research value. Low-quality responses may include spam and/or other kinds of responses that are rushed, incomplete, not responsive to the marketing question being asked, clearly biased, and/or otherwise undermine the quality (and thus the value) of the research being done. "Spam" may include, for example: gibberish; submissions by autonomous systems (a.k.a. "bots"); duplicate responses; and/or other kinds of data that are submitted for reasons other than those intended for the market research platform. For example, spammers may use bots to submit a large volume of responses, solely for the purpose of "earning" rewards provided by the market research platform, such as points, gift cards, etc.

When market research is conducted electronically, low-quality responses are a problem not only because of their limited research value, but also because of their impact on system resources and performance. Low-quality responses consume hardware resources (e.g., processing cycles, storage, network bandwidth, etc.), energy associated with operating hardware resources, etc. The additional resources needed to accommodate low-quality responses can also incur financial costs (e.g., hardware costs and/or hosting costs imposed by cloud infrastructure services), energy costs, etc.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to performance and quality in market research platforms.

SUMMARY

In general, in one aspect, one or more non-transitory computer-readable media store instructions that, when executed by one or more processors, cause the one or more processors to perform operations including: obtaining first usage data of a first set of survey respondents to a first market research survey, the first market research survey being associated with a first tenant of a multi-tenant market research survey platform and conforming to a first market research survey template provided by the multi-tenant market research survey platform; obtaining second usage data of a second set of survey respondents to a second market research survey, the second market research survey being associated with a second tenant of the multi-tenant market research survey platform and conforming to the first market research survey template provided by the multi-tenant market research survey platform; generating a first template-specific quality filter associated with the first market research survey template, based at least on the first usage data and the second usage data; and based at least on the first template-specific quality filter and third usage data of a particular survey respondent, identifying the particular survey respondent as a low-quality respondent.

Generating the first template-specific quality filter may include: aggregating the first usage data and the second usage data to obtain aggregated training data; labeling the aggregated training data to indicate that at least a subset of the aggregated training data is associated with low-quality respondents; and based at least on the aggregated training data, training a machine learning model to identify low-quality respondents.

Generating the first template-specific quality filter may include: obtaining a filter template including a base rule and at least one threshold variable, the at least one threshold variable corresponding to a cutoff value that delineates between low-quality respondents and acceptable-quality respondents; and based at least on the first usage data and the second usage data, determining a value for the at least one threshold variable.

The operations may further include: responsive to identifying the particular survey respondent as a low-quality respondent, restricting the particular survey respondent's use of the market research survey platform.

The first template-specific quality filter may be a rule-based filter, and the operations may further include: training a machine learning model to operate as a second template-specific quality filter; and responsive to determining that the machine learning model satisfies at least one switching criterion, switching from using the rule-based filter to using the machine learning model to identify low-quality respondents.

The first usage data and the second usage data may include one or more of (a) longitudinal data associated with responses by multiple respondents to one or more of a same question or similar questions, or (b) longitudinal data associated with responses by a particular respondent to multiple survey questions over multiple surveys.

The first usage data and the second usage data may include both (a) digital fingerprint attributes of the first set of survey respondents and the second set of survey respondents and (b) behavioral metadata describing trackable behavior of the first set of survey respondents and the second set of survey respondents.

In general, in one aspect, a system includes at least one device including a hardware processor. The system is configured to perform operations including: obtaining first usage data of a first set of survey respondents to a first market research survey, the first market research survey being associated with a first tenant of a multi-tenant market research survey platform and conforming to a first market research survey template provided by the multi-tenant market research survey platform; obtaining second usage data of a second set of survey respondents to a second market research survey, the second market research survey being associated with a second tenant of the multi-tenant market research survey platform and conforming to the first market research survey template provided by the multi-tenant market research survey platform; generating a first template-specific quality filter associated with the first market research survey template, based at least on the first usage data and the second usage data; and based at least on the first template-specific quality filter and third usage data of a particular survey respondent, identifying the particular survey respondent as a low-quality respondent.

Generating the first template-specific quality filter may include: aggregating the first usage data and the second usage data to obtain aggregated training data; labeling the aggregated training data to indicate that at least a subset of the aggregated training data is associated with low-quality respondents; and based at least on the aggregated training data, training a machine learning model to identify low-quality respondents.

Generating the first template-specific quality filter may include: obtaining a filter template including a base rule and at least one threshold variable, the at least one threshold variable corresponding to a cutoff value that delineates between low-quality respondents and acceptable-quality respondents; and based at least on the first usage data and the second usage data, determining a value for the at least one threshold variable.

The operations may further include: responsive to identifying the particular survey respondent as a low-quality respondent, restricting the particular survey respondent's use of the market research survey platform.

The first template-specific quality filter may be a rule-based filter, and the operations may further include: training a machine learning model to operate as a second template-specific quality filter; and responsive to determining that the machine learning model satisfies at least one switching criterion, switching from using the rule-based filter to using the machine learning model to identify low-quality respondents.

The first usage data and the second usage data may include one or more of (a) longitudinal data associated with responses by multiple respondents to one or more of a same question or similar questions, or (b) longitudinal data associated with responses by a particular respondent to multiple survey questions over multiple surveys.

The first usage data and the second usage data may include both (a) digital fingerprint attributes of the first set of survey respondents and the second set of survey respondents and (b) behavioral metadata describing trackable behavior of the first set of survey respondents and the second set of survey respondents.

In general, in one aspect, a method includes: obtaining first usage data of a first set of survey respondents to a first market research survey, the first market research survey being associated with a first tenant of a multi-tenant market research survey platform and conforming to a first market research survey template provided by the multi-tenant market research survey platform; obtaining second usage data of a second set of survey respondents to a second market research survey, the second market research survey being associated with a second tenant of the multi-tenant market research survey platform and conforming to the first market research survey template provided by the multi-tenant market research survey platform; generating a first template-specific quality filter associated with the first market research survey template, based at least on the first usage data and the second usage data; and based at least on the first template-specific quality filter and third usage data of a particular survey respondent, identifying the particular survey respondent as a low-quality respondent.

Generating the first template-specific quality filter may include: aggregating the first usage data and the second usage data to obtain aggregated training data; labeling the aggregated training data to indicate that at least a subset of the aggregated training data is associated with low-quality respondents; and based at least on the aggregated training data, training a machine learning model to identify low-quality respondents.

Generating the first template-specific quality filter may include: obtaining a filter template including a base rule and at least one threshold variable, the at least one threshold variable corresponding to a cutoff value that delineates between low-quality respondents and acceptable-quality respondents; and based at least on the first usage data and the second usage data, determining a value for the at least one threshold variable.

The method may further include: responsive to identifying the particular survey respondent as a low-quality respondent, restricting the particular survey respondent's use of the market research survey platform.

The first template-specific quality filter may be a rule-based filter, and the method may further include: training a machine learning model to operate as a second template-specific quality filter; and responsive to determining that the machine learning model satisfies at least one switching criterion, switching from using the rule-based filter to using the machine learning model to identify low-quality respondents.

The first usage data and the second usage data may include one or more of (a) longitudinal data associated with responses by multiple respondents to one or more of a same question or similar questions, or (b) longitudinal data associated with responses by a particular respondent to multiple survey questions over multiple surveys.

The first usage data and the second usage data may include both (a) digital fingerprint attributes of the first set of survey respondents and the second set of survey respondents and (b) behavioral metadata describing trackable behavior of the first set of survey respondents and the second set of survey respondents.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIGS. 2A-2K show a table of examples of tracked data points according to one or more embodiments;

FIG. 3 shows a table of examples of logic variables that may be included in a codified quality filter according to an embodiment;

FIG. 4 shows a table of examples of codified quality filters according to an embodiment;

DETAILED DESCRIPTION

Figure 1:
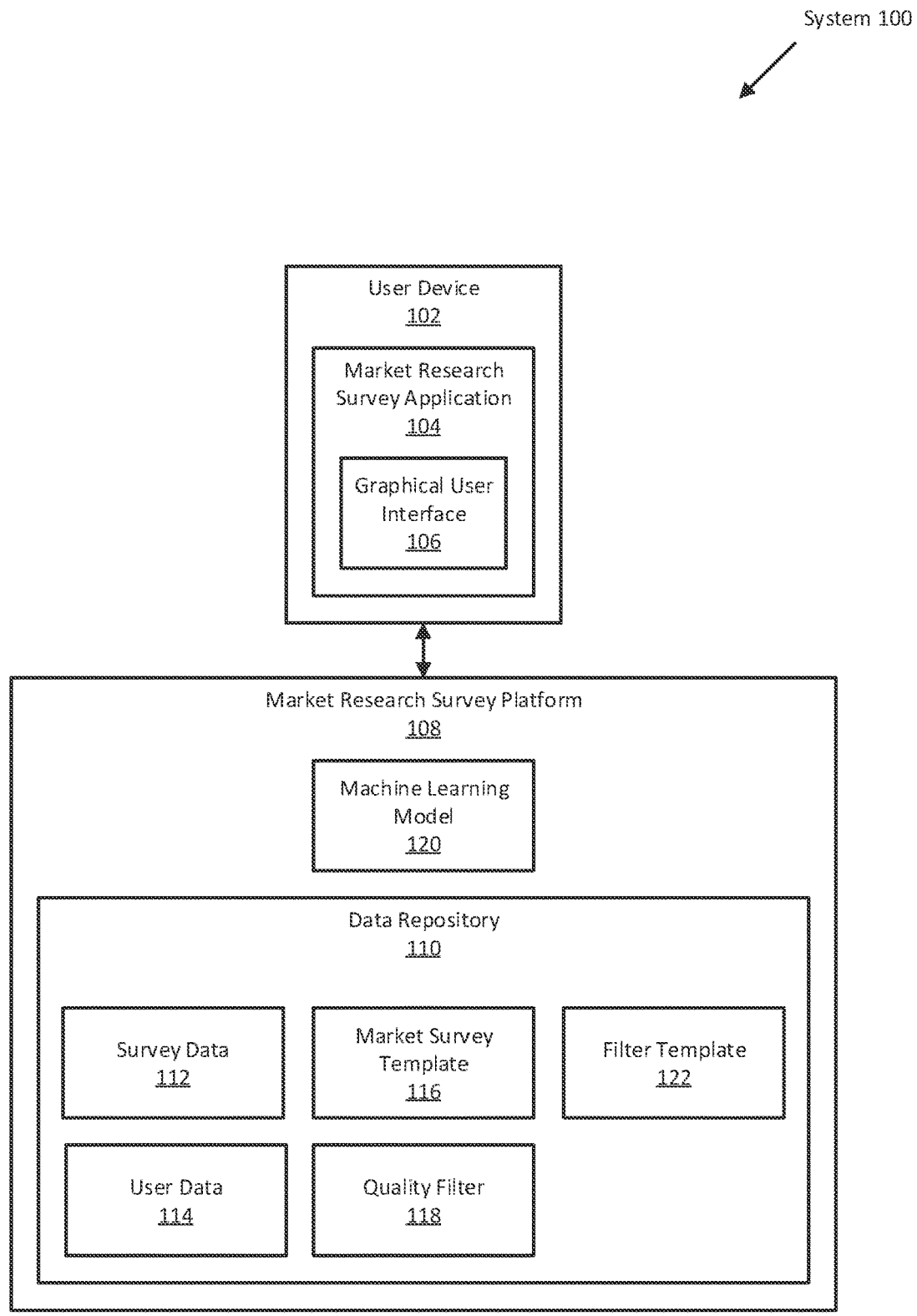
FIG. 1 is a block diagram of an example of a system according to an embodiment.

In general, one or more embodiments include systems and methods to improve the performance of a market research platform. Techniques described herein may reduce system load incurred by spammers and/or other kinds of low-quality respondents, thus avoiding potential costs associated with those resources and/or freeing up additional resources for higher-quality respondents. Reducing wasteful resource utilization may allow the system to perform faster, for example, by reducing strain on the database, application programming interface (API) layer, etc.

Alternatively or additionally, one or more embodiments include systems and methods to improve the quality of responses obtained by a market research platform. Specifically, techniques described herein may help identify and deter spammers and/or other kinds of low-quality responses. Deterring spammers and/or other kinds of low-quality responses improves the overall quality of responses that are retained. In addition, deterring spammers and/or other kinds of low-quality responses may reduce employee costs associated with "sanitizing" data sets to remove spam and other kinds of low-quality responses.

In an embodiment, a market research survey platform as described herein is a multi-tenant platform having multiple customers in the same industry and/or across industries. Data from multiple tenants may be aggregated to obtain a rich data set that can be used to generate rules and/or machine learning for identifying low-quality responses. A multi-tenant platform allows for a larger set of data (e.g., user demographics, survey responses, etc.) than what would typically be available in a survey system that (a) services only a single tenant and/or (b) does not aggregate data across tenants. This rich data set may allow the platform to generate more effective quality filters than what would be possible based on a smaller and/or single-tenant data set.

A multi-tenant market research survey platform may further include market research survey templates that multiple tenants can use to construct market research surveys. Survey templates provide relative heterogeneity across surveys based on the same template, even across multiple tenants, thus allowing the platform to generate template-specific quality filters. For example, a certain response may be considered low quality in a survey based on one template but high quality in a survey based on a different template. Template-specific quality filtering in a multi-tenant platform may thus allow for highly effective, domain-specific quality filtering.

Techniques described herein may be used to identify many different kinds of low-quality responses. For example, techniques described herein may be used to identify one or more of:

- "speeders," i.e., respondents who speed through surveys, not taking the time to provide quality responses;
- "straight-liners," i.e., respondents who provide the same answer every time or nearly every time—for example, by repeatedly choosing the Nth option over a series of multi-choice questions;
- sloppy, rushed, and/or otherwise low-effort responses;
- biased responses, i.e., responses that are always positive or always negative, which may not indicate a bad actor but are nonetheless unhelpful—as discussed herein, such biases may be detectable by analysis, e.g., in metadata; and/or
- responses that are biased (e.g., "primed") by prior questions. For example, if a user has previously answered a round of questions about HBO MAX, then a separate round of questions about Showtime Anytime may be biased by the first round. As discussed herein, such biases may be detectable by analysis, e.g., by finding patterns in the data.

I. System Architecture

As illustrated in FIG. 1, the system 100 includes a market research survey platform 108, or simply "platform" for ease of discussion, and a user device 102. The user device 102 includes a market research survey application 104, or simply "application" for ease of discussion, configured to communicate with the platform 108 over a network. In response to a user launching the application 104, the application 104 presents a graphical user interface (GUI) 106 on the user device 102. The GUI 106 includes user interface elements for participating in one or more market research surveys. The application 104 is configured to obtain data for populating the GUI 106 from the platform 108, and to communicate results of survey questions to the platform 108.

In an embodiment, the platform 108 is accessible to a retained set of users who are active over a period of time and answer questions regularly. For ease of discussion, operations are described herein in reference to a single user; these operations may be repeated any number of times for any number of users. A larger number of users may provide a richer data set for training the platform 108 to distinguish between low-quality and high-quality responses.

Together, the platform 108 and application 104 are configured to generate and present a market research survey interface in the GUI 106. Operations may be allocated between the platform 108 and application 104 in various ways. For example, the application 104 may be a web application accessible via a web browser, and the platform 108 may be configured to perform back-end operations to generate content (e.g., survey questions, animations, rewards, and/or other kinds of content) and provide the content in hypertext markup language (HTML) and/or another web protocol to the GUI 106. Alternatively, the user device 102 may be a device such as smartphone, tablet, laptop, or desktop computer and the application 104 may be an installable application or "app." The platform 108 may be configured to communicate with two or more kinds of application 104. For example, the platform 108 may include both (a) a web server providing a web-based version of the GUI 106 and (b) an application programming interface (API) accessible by an installable app that includes the GUI 106, thus providing a range of modalities for accessing a market research survey.

In general, the GUI 106 renders user interface elements and receives input via user interface elements. Examples of user interface elements include checkboxes, radio buttons, dropdown lists, list boxes, buttons, toggles, text fields, date and time selectors, command lines, sliders, pages, and forms. In an embodiment, the GUI 106 includes a grid of visual tiles that represent questions in a market research survey. The user interface elements allow a user to interact with the market research survey. A spammer or other kind of low-quality respondent may use automated software (for example, a "bot") to interact with the user interface elements, rather than interacting with them manually as intended.

Different components of the GUI 106 may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a GUI 106 may be specified in one or more other languages, such as Java, Python, Perl, C, C++, C#, and/or any other language or combination thereof.

As illustrated in FIG. 1, a data repository 110 may be configured to store survey data 112. Survey data 112 includes data associated with one or more surveys, such as: survey questions; answer options; game rewards associated with survey questions; and/or other survey-related data. Alternatively or additionally, a data repository 110 may be configured to store user data 114. User data 114 includes data associated with one or more users, such as: user profile information; login credentials; survey answers (which may be anonymized and/or aggregated among users); game rewards earned by each user; and/or other user-related data. User data 114 may include tracked data points used for response filtering, as discussed in further detail below.

A data repository 110 may be configured to store one or more market survey templates 116. A market survey template 116 includes predefined survey questions (or question formats) tied to specific business intents. For example, a market survey template 116 for a "concept test," used to evaluate a series of different design or messaging concepts against each other, may include a series of questions that tend to be fairly consistent among clients in that area; two or more clients (i.e., tenants of the platform, for whom market research surveys are conducted) may use the same market survey template 116 while editing (via one or more system interfaces) key elements specific to a particular product, such as the product's name and/or related imagery. The repeated use of such market survey templates 116 may allow the platform 108 to generate a set of benchmarks for responses. The platform 108 may leverage these benchmarks to configure one or more quality filters 118 and/or train a machine learning model 120, thus creating a powerful data ecosystem that, as it grows and evolves, becomes increasingly capable of identifying and preventing spammers and/or other kinds of low-quality responses.

The platform 108 may be configured to perform operations described herein for filtering market survey responses. To filter market survey responses, the platform 108 may be configured to apply one or more quality filters 118. In general, a quality filter 118 refers to a set of hardware and/or software configured to determine the quality of one or more market survey responses. A quality filter 118 may be configured to sort responses into two or more categories (e.g., low quality, acceptable quality, or high quality). Alternatively or additionally, a quality filter 118 may be configured to assign numerical values to responses, with one of a numerical scale representing the lowest quality and the other end of the numerical scale representing the highest quality. Many different kinds of metrics may be used to categorize and/or assign values to responses.

A quality filter 118 may be based on a filter template 122. A filter template 122 refers to a predefined format for a quality filter 118, based on one or more response attributes tracked by the platform 108. A tenant of the platform 108 may select or otherwise assign values to variables in a filter template 122, and the platform 108 may generate a quality filter 118 based on the tenant's input. For example, a tenant may select a threshold quality value (e.g., 60 percent) below which a response is considered low quality. Some examples of quality filters 118 and filter templates 122 are discussed in further detail below.

In an embodiment, a data repository 110 is any type of storage unit and/or device (e.g., a file system, database, collection of tables, or any other storage mechanism) for storing data. A data repository 110 may include multiple different storage units and/or devices. The multiple different storage units and/or devices may or may not be of the same type or located at the same physical site. Further, a data repository 110 may be implemented or may execute on the same computing system as one or more other components of the system 100. Alternatively or additionally, a data repository 110 may be implemented or executed on a computing system separate from one or more other components of the system 100. A data repository 110 may be logically integrated with one or more other components of the system 100. Alternatively or additionally, a data repository 110 may be communicatively coupled to one or more other components of the system 100 via a direct connection or via a network. In FIG. 1, a data repository 110 is illustrated as storing various kinds of information. Some or all of this information may be implemented and/or distributed across any of the components of the system 100. However, this information is illustrated within the data repository 110 for purposes of clarity and explanation.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

II. Tracked Data Points

As discussed above, a market research survey platform may store user data that includes tracked data points used for response filtering. Specifically, tracked data points include data that the system tracks and applies to codified rules and/or to a machine learning model for response filtering. Tracked data points may include digital fingerprint attributes and/or or behavioral metadata that could potentially be indicators of low response quality or spam.

Digital fingerprint attributes refer to data that uniquely identifies a user and/or the user's device. Digital fingerprint attributes may include, for example, one or more of:
 IP address;
 autonomous system number (ASN);
 user agent/browser type;
 hosting provider;
 geographical location; and/or
 email address.

Behavioral metadata refers to metadata that describes a user's behavior while using the platform generally and/or specific features thereof. One or more items of behavioral metadata may be associated with general platform behavior. Such metadata may include, for example, one or more of:

timestamp corresponding to when the user's identity was verified (e.g., via a verification process for the user's email address, etc.);

timestamp corresponding to completion of initial onboarding (e.g., completion of initial questions and training, which may culminate in a user verification process);

login timestamp; and/or session timestamp.

One or more items of behavioral metadata may be associated with specific surveys and/or questions. Such metadata may include, for example, one or more of:

timestamp upon opening a survey or question;

timestamp upon completing a survey or question;

time to complete a particular action (e.g., provide input responsive to a system prompt), which may provide an indication of read time (e.g., where a bot may respond more quickly that the typical amount of time needed to read a prompt)

timestamp upon close (e.g., for a survey or question that is opened, then closed before completion);

timestamp upon skip (e.g., if a user/respondent reads a question, decides they do not want to respond, and closes it, so that the question is dismissed and not served up to the user again); and/or mouse position and movement (e.g., to identify patterns of movement, or lack thereof, corresponding to bot behavior).

One or more items of behavioral metadata may be associated with input fields into which a user is able to provide open-ended input. Such metadata may include, for example, one or more of:

total question character count; and/or total response character count.

In an embodiment, the system presents questions and/or answers in a scale or grid, and some behavioral metadata may be associated with the user's interactions with the scale or grid. Such metadata may include, for example, one or more of:

position of an answer choice in the scale or grid (e.g., first, second, last, first row, second row, last row, first column, second column, last column, etc.); and/or positivity or negativity of the response, depending on the rating scale provided.

The system may be configured to generate benchmarking data, based on aggregated behavioral metadata, and use the benchmarking data to determine a particular user's general positivity/negativity tendencies.

One or more items of behavioral metadata may be associated with user interactions with multiple-choice questions. Such metadata may include, for example, one or more of:

position of the answer choice selected by the user; and/or number of answers selected, if multiple selections are permitted.

One or more items of behavioral metadata may be associated with particular survey templates. A given survey template may be used, for example, by multiple clients of the platform. Behavioral metadata may be aggregated at a client level and/or across multiple clients using the same template. Such metadata may include, for example, one or more of:

timestamp upon opening the survey;

timestamp upon completing the survey; and/or time to complete a particular action (e.g., provide input responsive to a system prompt), which may provide an indication of read time (e.g., where a bot may respond more quickly than the typical amount of time needed to read a prompt).

FIGS. 2A-2K show a table of examples of tracked data points according to one or more embodiments. Specifically, FIGS. 2A-2K includes examples of: event names (i.e., the names of behaviors being tracked within the platform); event definitions (i.e., descriptions of behaviors being tracked); property names (i.e., names of additional information related to the behavior); property definitions (i.e., descriptions of the related information); and data types (i.e., the types of information being collected, such as numeric, date, etc.).

III. Triggered Actions

In general, as described herein, triggered actions are actions that the system executes upon the satisfaction of one or more rule-based conditions and/or when the output of a machine learning model satisfies one or more triggering criteria (e.g., outputting a value that is above or below a predetermined threshold value). In general, the system may execute a triggered action upon determining that a user is taking an action or set of actions that is suspicious or outside of the normal expectations. Such a condition may indicate that a user is a bad actor, or at least may be suspected of being a bad actor.

One or more triggered actions may include "quarantining" a user on the platform, for a period of time. A quarantined user may be prevented from performing, for example, one or more of the following actions:

accessing the platform as a whole;

responding to any questions;

responding to particular question types (e.g., to reduce "priming" or other bias effects);

responding to particular template types; and/or responding to questions or surveys from a particular industry or vertical.

Alternatively or additionally, one or more triggered actions may include imposing an artificial delay between questions, preventing the user from submitting answers quickly (e.g., if the user is suspected to a be a bot submitting answers faster than a typical human is capable of) until the system is better able to determine whether the user is a bad actor. One or more triggered actions may include banning a user (including, optionally, the user's IP address or other device- or location-specific identifier) from the platform indefinitely.

One or more triggered actions may include presenting an educational or warning message to a user, relating to the behavior flagged by the system. The system may present the message, for example, in one or more of the following formats:

in-app (e.g., via a pop-up, modular dialog, slide-in message, or another form of in-app notification);

email;

push notifications (e.g., via a notification system of a mobile device); and/or text message.

A message to a user may be formulated to help the user provide higher-quality responses. For example, the message may be formulated to train a user to not be so uniformly positive, to answer slower, etc.

One or more triggered actions may include presenting a user with one or more "trap" questions. A trap question may be formulated to help determine whether the user is paying attention, properly reading the question text, etc. Presenting a trap question may include, for example, one or more of the following:

presenting a question with a single correct or predetermined answer choice, to determine whether the user selects the correct option;

presenting a question with nonsensical answers and/or answers relating to fictional products, to determine whether the user selects such an answer (indicating that they are not paying attention and/or not reading the answer choices, such as if a bot is selecting the answers); and/or presenting an open-ended question that instructs the user to supply one or more specific words in the open-ended response text.

Alternatively or additionally, one or more triggered actions may include generating a report (e.g., in a system log) and/or alerting a human overseer of the platform (e.g., via email, text message, app notification, etc.) to investigate the suspicious user activity.

IV. Examples of Codified Quality Filters

For purposes of clarity, some detailed examples are set forth below. These examples are provided for illustrative purposes only and should not be construed as limiting one or more embodiments.

As discussed above, a market research survey platform may store one or more quality filters that is/are codified, i.e., predefined in code (as compared with a machine learning model that is trained to filter responses without relying exclusively on predetermined filtering rules). A codified quality filter includes a set of hardware and/or software rules that logically connect tracked data points with triggered actions. Specifically, based on the value(s) of one or more tracked data points, a codified quality filter may indicate which triggered action(s) to execute.

FIG. 3 shows a table of examples of logic variables that may be included in a codified quality filter according to an embodiment, the values of which may be used to determine whether to perform a triggered action. Each logic variable may be based on the value(s) of one or more tracked data points.

FIG. 4 shows a table of examples of codified quality filters according to an embodiment, including logical rules that connect the values of tracked data points with respective triggered actions.

V. Machine Learning

As discussed above, a market research survey platform may be configured to train a machine learning model to identify low-quality responses. Specifically, machine learning includes a set of hardware and/or software that trains a machine learning model to filter for spam and/or other kinds of low-quality responses. Machine learning may include determining when to execute triggered actions. Machine learning may allow the system to perform more sophisticated filtering over time, and may provide better filtering than predetermined (i.e., codified) rule-based triggering. Machine learning may be more effective when it has access to data from a retained audience that answers questions over time, in some examples using template-based surveys. Such data can facilitate the use of machine learning to identify patterns, trends, etc., and become more effective over time. Training a machine learning model may include supervised learning, based on user validation or confirmation that certain responses qualify as spam and/or other kinds of low-quality (e.g., biased or inconsistent).

Machine learning may include training a machine learning model based on responses that are manually identified (e.g., tagged, flagged, and/or otherwise identified) as spam and/or otherwise low-quality. For example:

a client user may mark a response as spam and/or another kind of low-quality response; and/or an internal user of the platform may mark a response as spam and/or another kind of low-quality response.

Machine learning may include training a machine learning model based on data from a word filter that identifies known spam and/or other kinds of low-quality response patterns. For example, a word filter may perform one or more of the following:

mark an open-ended response as spam; and/or mark an open-ended response as a duplicate.

Machine learning may include training a machine learning model based on identified positivity/confirmation biases. For example, machine learning may be based on one or more of:

average positivity score for a respondent, versus an overall average score for users of a specific template; and/or average positivity score for a respondent, versus overall average score for users across multiple templates.

Machine learning may include training a machine learning model based on one or more specific items of data associated with a user (e.g., one or more tracked data points, as discussed above, and/or other user-related data). For example, machine learning may be based on one or more of:

a user is suspended/quarantined; and/or a user is banned

Machine learning may include training a machine learning model based on responses that are identified as incorrect. For example, incorrect responses to trap questions may correspond to inattention and/or spam.

In an embodiment, as the machine learning model learns from known spam and/or other kinds of low-quality responses over time, its accuracy and/or success rate at filtering spam and/or other kinds of low-quality responses may improve. Accordingly, machine learning may help the system become increasingly better at limiting such responses, rather than being limited in effectiveness by a predetermined set of rules.

In an embodiment, the system initially uses rule-based triggering, but switches to using a machine learning model once the model has been sufficiently trained. For example, activating a particular triggered action may be preconditioned on the availability of a threshold amount of historical data, a threshold number of training events, and/or a threshold success rate when validating a machine learning model against a set of test data, to help ensure that the triggered action achieves the desired result (e.g., that high-quality respondents are not incorrectly identified as bad actors). In some embodiments, the system may initially use a fixed rule set for executing a particular triggered action, and may switch to a machine learning model when the system determines that the model has been sufficiently trained that it will likely perform better than the fixed rule set.

In general, training a machine learning model uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs). A system may use multiple machine learning engines and/or multiple machine learning models for different purposes. In an embodiment, the machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. For example, a supervisory signal may indicate that a response is spam and/or another kind of low-quality response. In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

A machine learning engine may use many different techniques to label, classify, and/or categorize inputs. A machine learning engine may transform inputs into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

VI. Filtering Market Research Responses

Figure 5:
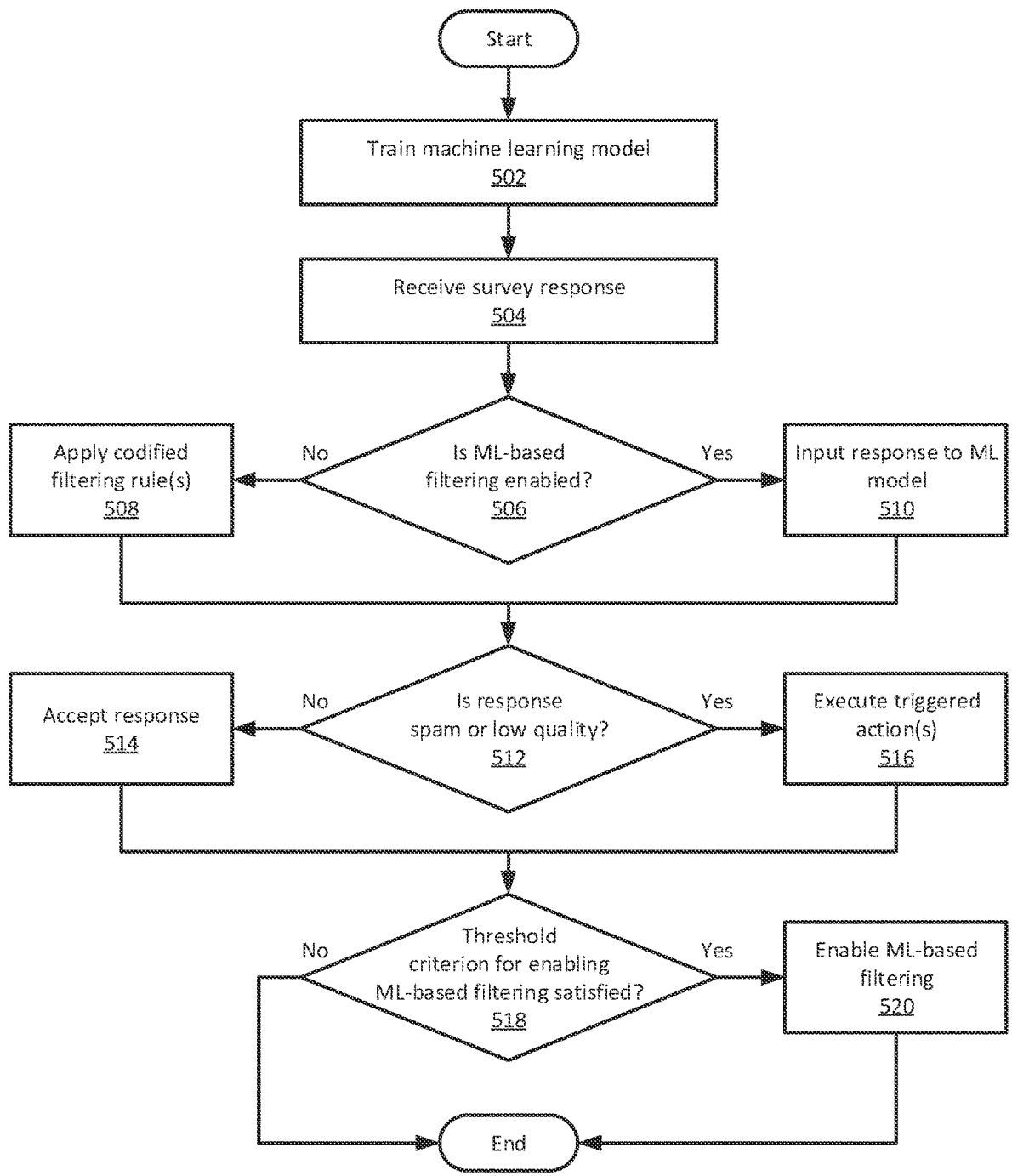
FIG. 5 is a flow diagram of an example of operations for filtering market research responses according to an embodiment.

FIG. 5 is a flow diagram of an example of operations for filtering market research responses according to an embodiment. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, a system (e.g., one or more system components described herein) trains a machine learning model to filter market research responses (Operation 502). Training the machine learning model may use one more techniques described herein. For example, training the machine learning model may start with supervised learning and then continue with unsupervised learning on an ongoing basis.

In an embodiment, the system receives a market research response (Operation 504), i.e., a response to a question in a market research survey provided by a market research platform. Receiving the response may include obtaining metadata associated with a user providing the response, such as tracked data points as described herein.

The system may be configured to start by using one or more codified filtering rules and then switch to machine-learning-based filtering when a threshold criterion is satisfied. The system may determine whether machine-learning-based filtering is enabled (Decision 506). If machine-learning-based filtering is enabled, then the system may input the response to the trained machine learning model (Operation 510). If machine-learning-based filtering is not enabled, then the system may apply one or more codified filtering rules to the response (Operation 508). In some cases, the system may apply both machine learning and one or more codified filtering rules.

Based on machine learning and/or one or more codified filtering rules, the system determines whether the response is spam or low quality (Decision 512). If the response is spam or low quality, then the system executes a triggered action (Operation 516) to handle the spam or low-quality response. For example, the system may execute one or more triggered actions described herein. If the response is not spam or low quality, then the system accepts the response (Operation 514). Accepting the response may include adding the response to a set of accepted responses, which may be used to analyze results of the market research survey.

As discussed above, the system may be configured to start by using one or more codified filtering rules and then switch to machine-learning-based filtering when a threshold criterion is satisfied. In such cases, the system may determine whether a threshold criterion for enabling machine-learning-based filtering is satisfied (Decision 518). For example, a threshold criterion may require that the machine learning model be sufficiently trained (e.g., based on a threshold amount of data and/or a threshold number of training cycles). If the threshold criterion is satisfied, then the system enables machine-learning-based filtering (Operation 520). As discussed above, training the machine learning model may continue even after machine-learning-based filtering is enabled.

VII. General; Computer Systems; Networks

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 6:
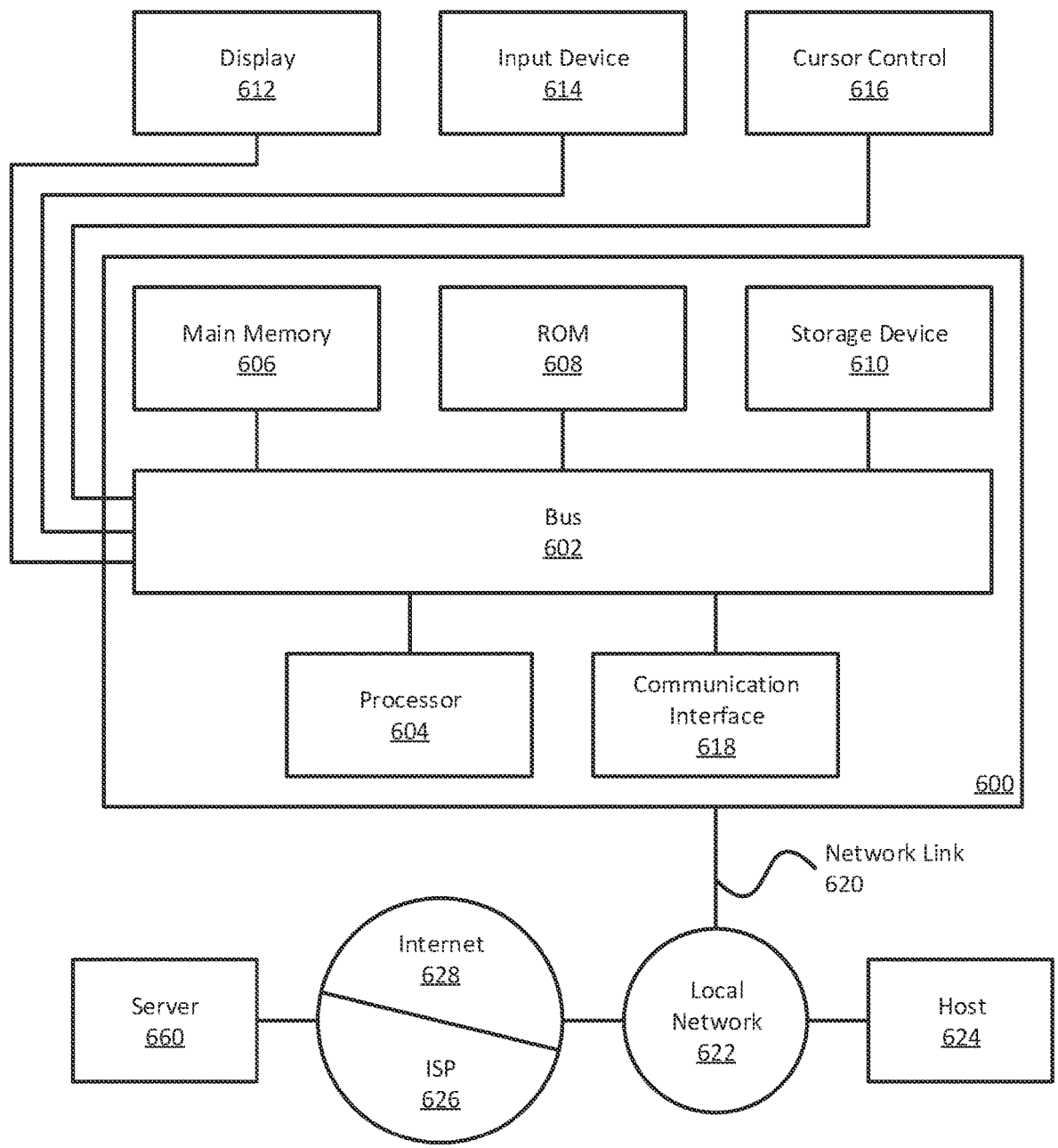
FIG. 6 is a block diagram of an example of a computer system according to an embodiment.

For example, FIG. 6 is a block diagram of an example of a computer system 600 according to an embodiment. Computer system 600 includes a bus 602 or other communication mechanism for communicating information, and a hardware processor 604 coupled with the bus 602 for processing information. Hardware processor 604 may be a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in one or more non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or additionally, computer system 600 may receive user input via a cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Alternatively or additionally, computer system 6 may include a touchscreen. Display 612 may be configured to receive user input via one or more pressure-sensitive sensors, multi-touch sensors, and/or gesture sensors. Alternatively or additionally, computer system 600 may receive user input via a microphone, video camera, and/or some other kind of user input device (not shown).

Computer system 600 may implement the techniques described herein using customized hard-wired logic, one or more ASICs or FPGAs, firmware, and/or program logic which in combination with other components of computer system 600 causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 602. Transmission media may also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 600 may receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 660 might transmit a requested code for an application program through Internet 628, ISP 626, local network 622, and communication interface 618.

The received code may be executed by processor 604 as it is received, and/or stored in storage device 610, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. A method performed by processing circuitry of a computing system, the method comprising:

training a machine learning model (MLM) to perform a first filtering operation based on first usage data of a first plurality of survey respondents to a first survey and second usage data of a second plurality of survey respondents to a second survey, the first survey being associated with a first tenant of a multi-tenant survey platform and conforming to a survey template provided by the multi-tenant survey platform, and the second survey being associated with a second tenant of the multi-tenant survey platform and conforming to the survey template provided by the multi-tenant survey platform, wherein training the MLM to perform the first filtering operation includes inputting digital fingerprint attributes and behavioral metadata into the MLM over a plurality of training cycles to identify responses from bots, the behavioral metadata including a timestamp and the digital fingerprint attributes including one or more of:
(1) an IP address,
(2) an autonomous system number,
(3) a hosting provider, and
(4) an e-mail address;

receiving a first set of survey responses to the first and second surveys;

in response to determining that the MLM is not enabled, performing a second filtering operation on the first set of survey responses by a codified rule-based filter, the second filtering operation identifying a first subset of the first set of survey responses as being responses from bots;

detecting that a threshold condition has been met, the threshold condition being that a threshold number of training cycles have been performed;

in response to determining that the threshold condition has been met, enabling the MLM;

receiving a second set of survey responses to the first and second surveys;

in response to determining that the MLM has been enabled, performing the first filtering operation by the MLM on the second set of survey responses, the first filtering operation identifying a second subset of the second set of survey responses as being responses from bots; and automatically, via the processing circuitry, restricting, in real-time, usage of the first and second subsets of the computing system by users associated with the survey responses, including quarantining users associated with the survey responses of the first and second subsets to limit access by those users of the computing system for a period of time;

wherein quarantining users associated with the survey responses of the first and second subsets to limit access by those users of the computing system includes one of:
preventing those users from responding to any questions and
preventing those users from responding to particular types of questions.

2. The method of claim 1, wherein training the MLM to perform the first filtering operation includes performing supervised learning based on survey responses of the first usage data and second usage data being identified by a user as being responses from bots.

3. The method of claim 1, wherein training the MLM to perform the first filtering operation includes marking survey responses of the first usage data and second usage data that were identified by the second filtering operation as being responses from bots, and learning from the marked survey responses.

4. The method of claim 1, wherein training the MLM to perform the first filtering operation includes performing unsupervised learning using cluster analysis to identify commonalities in the first usage data and second usage data.

5. The method of claim 1, wherein training the MLM to perform the first filtering operation includes:
while the threshold condition remains unmet, performing supervised learning based on survey responses of the first usage data and second usage data being identified by a user as being responses from bots; and
in response to determining that the MLM has been enabled, updating the MLM by performing unsupervised learning using cluster analysis to identify commonalities in the second set of survey responses to the first and second surveys.

6. The method of claim 1 wherein using behavioral metadata to identify responses from bots includes using a time to complete a particular action to train the MLM.

7. The method of claim 1, wherein the threshold condition being met includes the MLM incurring a threshold number of training events.

8. The method of claim 1, wherein the threshold condition being met includes a first success rate of the MLM on a set of test data exceeding a second success rate of the second filtering operation on the set of test data.

9. The method of claim 1, wherein automatically restricting, in real-time, usage of the first and second subsets of the computing system by users associated with the survey responses further includes reducing a speed at which users associated with the survey responses of the first and second subsets are permitted to enter additional survey responses.

10. The method of claim 1, wherein automatically restricting, in real-time, usage of the first and second subsets of the computing system by users associated with the survey responses further includes banning users associated with the survey responses of the first and second subsets from accessing the computing system.

11. One or more non-transitory computer-readable media storing instructions that, when executed by one or more processors, cause the one or more processors to perform operations comprising:
training a machine learning model (MLM) to perform a first filtering operation based on first usage data of a first plurality of survey respondents to a first survey and second usage data of a second plurality of survey respondents to a second survey, the first survey being associated with a first tenant of a multi-tenant survey platform and conforming to a survey template provided by the multi-tenant survey platform, and the second survey being associated with a second tenant of the multi-tenant survey platform and conforming to the survey template provided by the multi-tenant survey platform, wherein training the MLM to perform the first filtering operation includes inputting digital fingerprint attributes and behavioral metadata into the MLM over a plurality of training cycles to identify responses from bots, the behavioral metadata including a timestamp and the digital fingerprint attributes including one or more of:
(1) an IP address,
(2) an autonomous system number,
(3) a hosting provider, and
(4) an e-mail address;
receiving a first set of survey responses to the first and second surveys;
in response to determining that the MLM is not enabled, performing a second filtering operation on the first set of survey responses by a codified rule-based filter, the second filtering operation identifying a first subset of the first set of survey responses as being responses from bots;
detecting that a threshold condition has been met, the threshold condition being that a threshold number of training cycles have been performed;
in response to determining that the threshold condition has been met, enabling the MLM;
receiving a second set of survey responses to the first and second surveys;
in response to determining that the MLM has been enabled, performing the first filtering operation by the MLM on the second set of survey responses, the first filtering operation identifying a second subset of the second set of survey responses as being responses from bots; and
automatically, via the one or more processors, restricting, in real-time, usage of the first and second subsets of the computing system by users associated with the survey responses, including quarantining users associated with the survey responses of the first and second subsets to limit access by those users of the computing system for a period of time;
wherein quarantining users associated with the survey responses of the first and second subsets to limit access by those users of the computing system includes one of:
preventing those users from responding to any questions and
preventing those users from responding to particular types of questions.

12. A system comprising at least one device including processing circuitry configured to perform operations comprising:
training a machine learning model (MLM) to perform a first filtering operation based on first usage data of a first plurality of survey respondents to a first survey and second usage data of a second plurality of survey respondents to a second survey, the first survey being associated with a first tenant of a multi-tenant survey platform and conforming to a survey template provided by the multi-tenant survey platform, and the second survey being associated with a second tenant of the multi-tenant survey platform and conforming to the survey template provided by the multi-tenant survey platform, wherein training the MLM to perform the first filtering operation includes inputting digital fingerprint attributes and behavioral metadata into the MLM over a plurality of training cycles to identify responses from bots, the behavioral metadata including a timestamp and the digital fingerprint attributes including one or more of:
(1) an IP address,
(2) an autonomous system number,
(3) a hosting provider, and
(4) an e-mail address;

receiving a first set of survey responses to the first and second surveys;

in response to determining that the MLM is not enabled, performing a second filtering operation on the first set of survey responses by a codified rule-based filter, the second filtering operation identifying a first subset of the first set of survey responses as being responses from bots;

detecting that a threshold condition has been met, the threshold condition being that a threshold number of training cycles have been performed;

in response to determining that the threshold condition has been met, enabling the MLM;

receiving a second set of survey responses to the first and second surveys;

in response to determining that the MLM has been enabled, performing the first filtering operation by the MLM on the second set of survey responses, the first filtering operation identifying a second subset of the second set of survey responses as being responses from bots; and automatically, via the processing circuitry, restricting, in real-time, usage of the first and second subsets of the computing system by users associated with the survey responses, including quarantining users associated with the survey responses of the first and second subsets to limit access by those users of the computing system for a period of time;

wherein quarantining users associated with the survey responses of the first and second subsets to limit access by those users of the computing system includes one of:
preventing those users from responding to any questions and
preventing those users from responding to particular types of questions.

13. The system of claim 12, wherein training the MLM to perform the first filtering operation includes performing unsupervised learning using cluster analysis to identify commonalities in the first usage data and second usage data.

14. The system of claim 12, wherein training the MLM to perform the first filtering operation includes:
while the threshold condition remains unmet, performing supervised learning based on survey responses of the first usage data and second usage data being identified by a user as being responses from bots; and
in response to determining that the MLM has been enabled, updating the MLM by performing unsupervised learning using cluster analysis to identify commonalities in the second set of survey responses to the first and second surveys.

15. The method of claim 1 wherein the timestamp of the behavioral metadata establishes one of the following:
when an identity of a user filling out a survey was verified;
when the user filling out the survey performed a login;
when the user filling out the survey initiated a session;
when the survey was opened;
when the survey was completed;
when a question was opened; and
when the question was completed.

* * * * *